J. W. ENSOR.
VEHICLE TONGUE ATTACHMENT.
APPLICATION FILED SEPT. 19, 1913.
1,102,650.
Patented July 7, 1914.
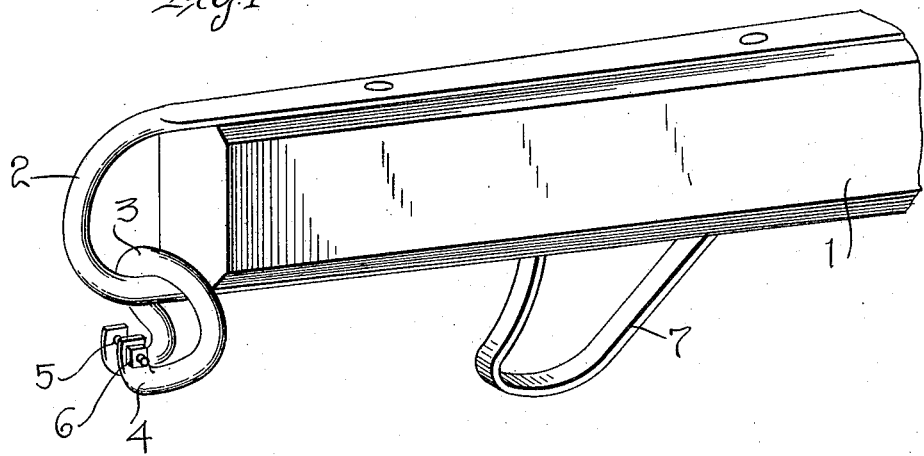
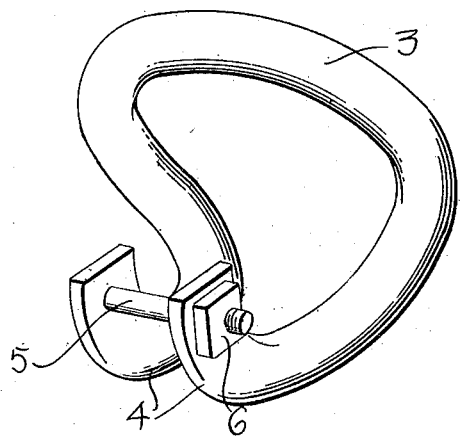
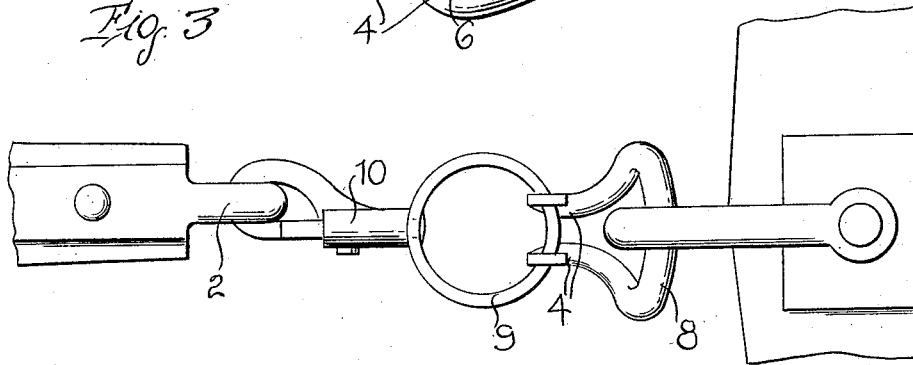
Inventor
J. W. ENSOR

UNITED STATES PATENT OFFICE.

JOSEPH W. ENSOR, OF MARCUS, SOUTH DAKOTA.

VEHICLE TONGUE ATTACHMENT.

1,102,650.   Specification of Letters Patent.   Patented July 7, 1914.

Application filed September 19, 1913. Serial No. 790,664.

*To all whom it may concern:*

Be it known that I, JOSEPH W. ENSOR, a citizen of the United States, residing at Marcus, in the county of Meade and State of South Dakota, have invented certain new and useful Improvements in Vehicle Tongue Attachments, of which the following is a specification, reference being had to the accompanying drawings.

This invention relates to new and useful improvements in vehicle tongue attachments and has for its object to provide a hook-like member adapted for application to the outer end of a vehicle tongue to provide a lengthener therefor.

A further object of the invention resides in providing a hook formed of a single piece of metal particularly adapted for application to use on a tongue, but which may be used for various other purposes wherein a hook is desired.

A still further object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a perspective view showing my device applied to use on a tongue of a vehicle. Fig. 2 is an enlarged perspective view of the same removed; and Fig. 3 illustrates a modified arrangement of the device hereinafter specifically described.

In describing my invention, I shall refer to the drawing in which similar reference characters designate corresponding parts throughout the several views and in which—

1 indicates a vehicle tongue of the usual or any preferred character having the clip 2 of the usual form applied to the outer end thereof.

My invention consists primarily of a hook 3 which is formed of a single piece of metal looped intermediate of its ends and then bent to form a hook proper. The arms of the loop at the point of bending are disposed inwardly to form a narrow neck-like portion on the hook, as shown at 4 and the free ends of the arms of the material forming the hook are provided with openings through which is disposed a bolt 5. A nut 6 is engaged with the threaded end of said bolt to secure the latter in position on the hook.

This device is particularly adapted for use on a vehicle tongue to permit of the positioning of the neck-yoke forward of the usual position for the same on the tongue. In order to carry out this idea, the hook is so engaged with the clip on the end of the tongue as to permit the loop or crown of the metal forming this hook to be received on the lower portion of the clip and thus permit the remaining portion thereof, through which the bolt 5 is disposed, to project downwardly therebelow. This obviously and as seen from Fig. 1 of the drawing, permits the hook-like portion to project below the tongue 1 at the extreme forward end thereof, whereby to receive therein a neck yoke. The usual hold-back 7 of the tongue is disposed some distance in the rear of the clip, as ordinarily is true. The neck-yoke may be connected with my improved hook and thus a substantial lengthener is provided for the tongue.

This device, as stated above, is particularly adapted for use in connection with vehicle tongues to act as a hold-back for the neck yokes thereon, but if desired, it may be used as a grab hook on lock chains and may be used in any connection whatsoever, wherein a hook of this character is desired.

In Fig. 3, I have shown a slight modification of the invention wherein the hook 8 which is formed identically the same as the hook 3 above described, has a ring member 9 engaged with the openings in the free ends thereof, instead of the bolt as described in the first mentioned form. This ring member has a snap hook 10 swiveled thereto which enables the device to be quickly and readily applied to and removed from the clip on the tongue. This modified form is particularly adapted for use when the device is applied for team use.

From the foregoing description of the construction of my improved device, the manner of applying the same to use will be readily understood and it will be seen that I have provided a device which is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

1. An attachment for vehicle tongues comprising a hook formed of a single piece of metal looped intermediate of its ends and bent intermediate the free ends of the metal and the crown of the loop, and means connecting the free ends of the metal forming one end of the hook.

2. A hook of the class described formed of a single piece of metal looped intermediate of its ends and bent intermediate the free ends of the metal and the crown of the loop, the arms of the hook at the point of bending tending to converge to form a neck-like portion on the hook, and means connecting the free ends of the arms forming one end of the hook.

3. A hook member of the class described formed of a single piece of metal looped intermediate of its ends and bent at points intermediate the free ends of the metal and the crown of the loop, a ring member engaged with the free ends of the arm forming one end of the hook, and a snap hook swiveled to said ring member whereby to removably secure the device to an object.

In testimony whereof I hereunto affix my signature in the presence of two witnesses.

JOSEPH W. ENSOR.

Witnesses:
CLYDE C. REED,
MITCHELL BARADA.

Copies of this patent may be obtained for five cents each, by addressing the "Commissioner of Patents, Washington, D. C."